March 25, 1969

E. L. GALLE 3,434,410

BOTTOM FEED QUENCH DRYER APPARATUS

Filed April 9, 1965

INVENTOR.
EDWARD L. GALLE
BY
James V. Harmon
ATTORNEYS

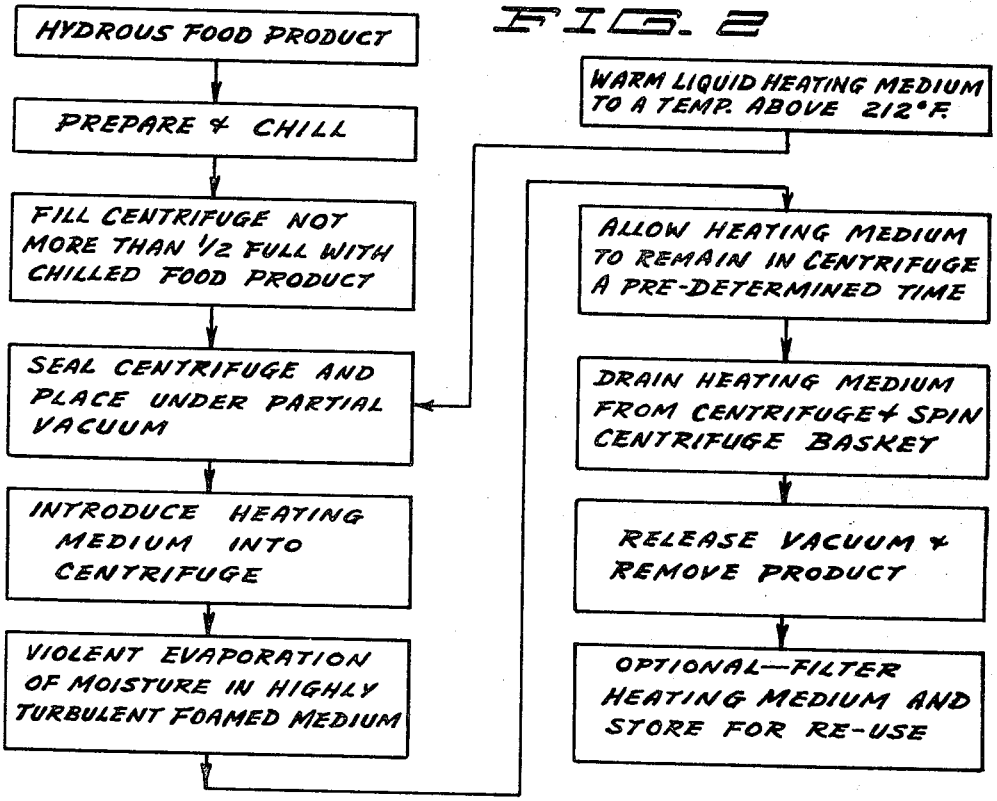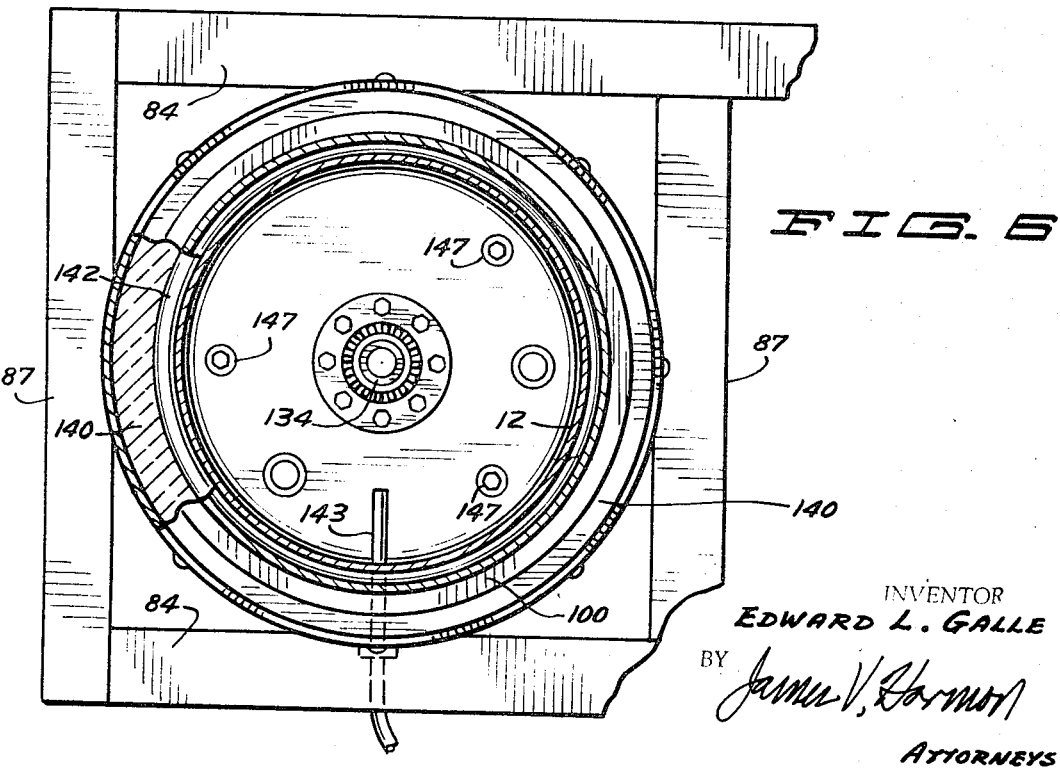

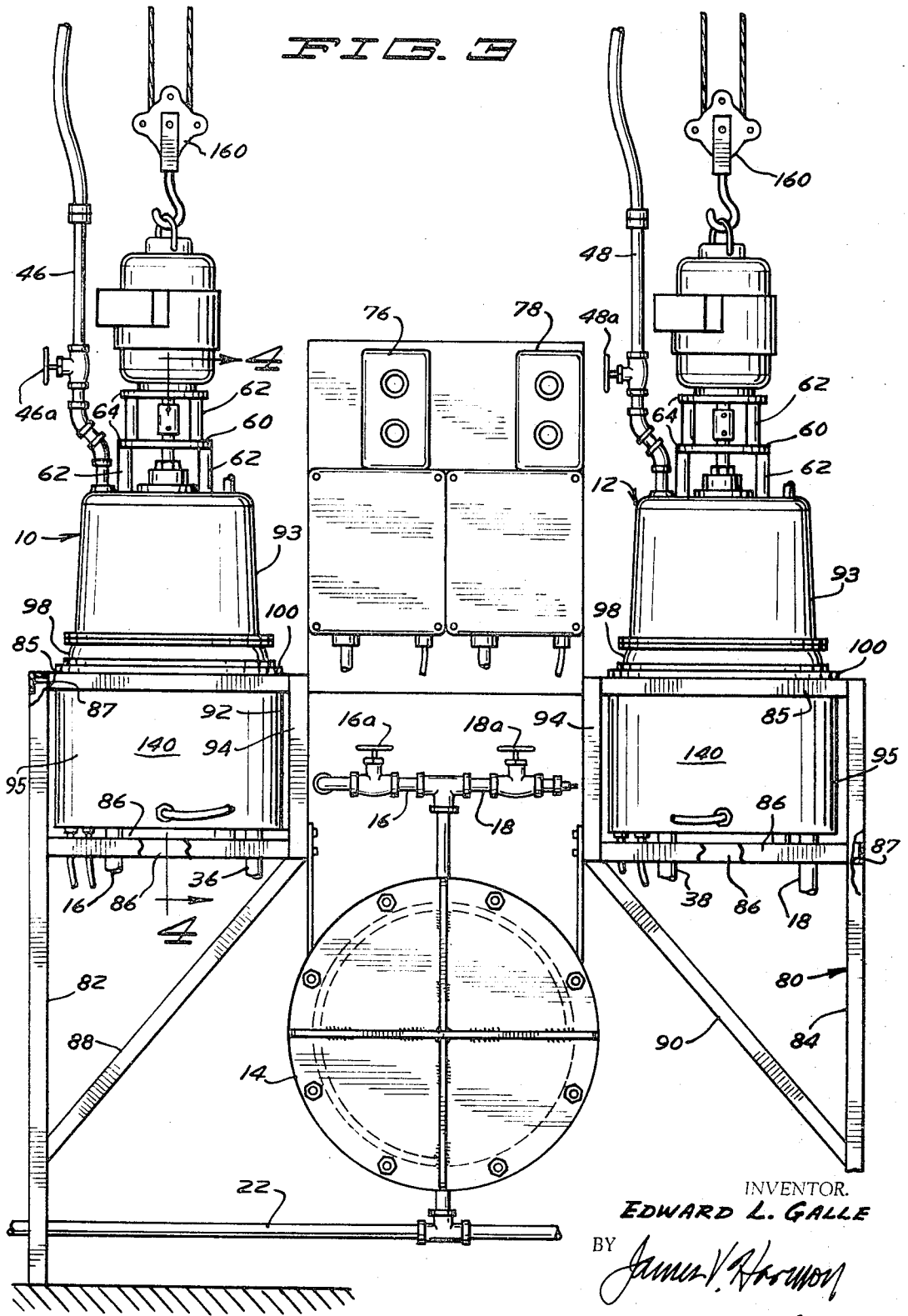

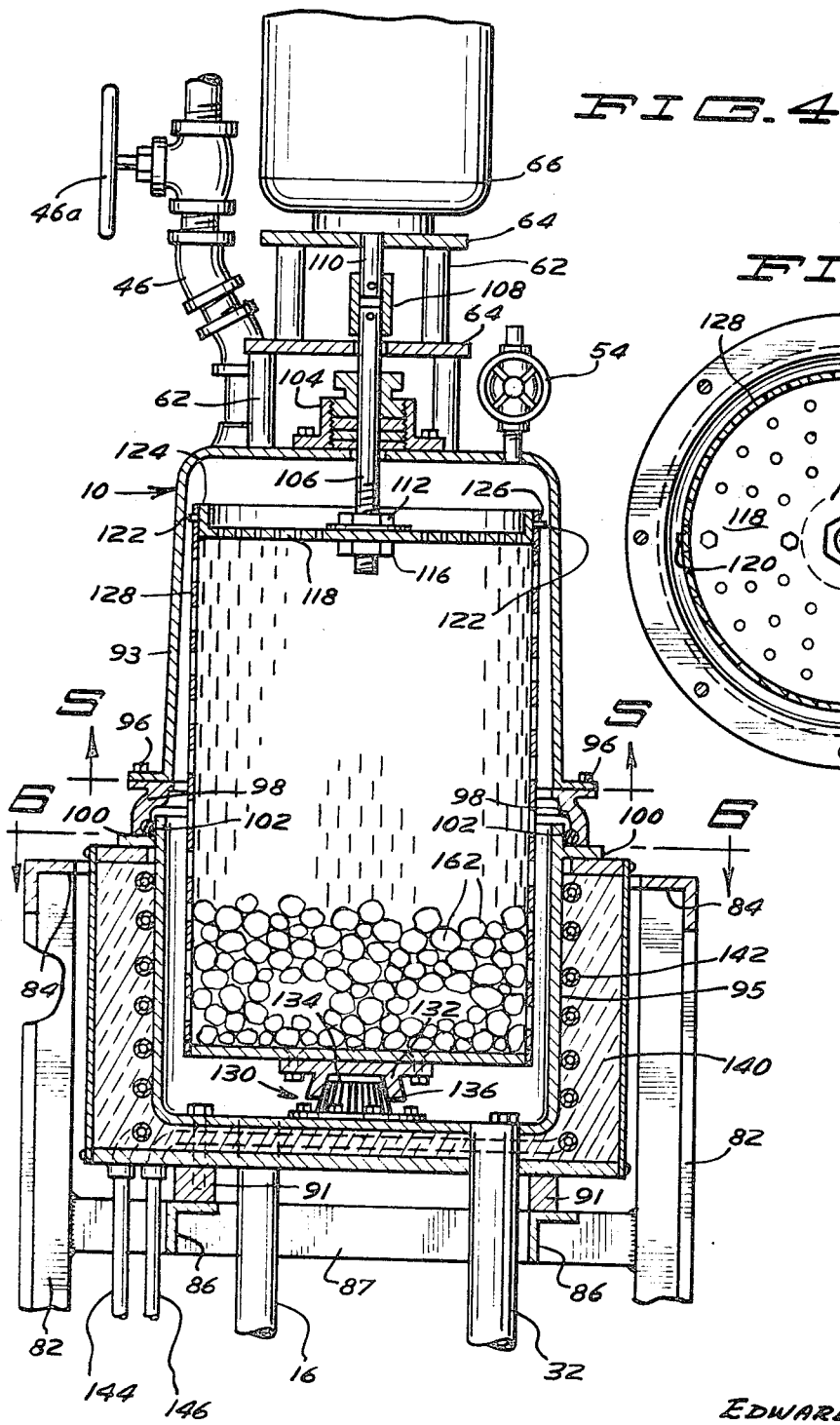
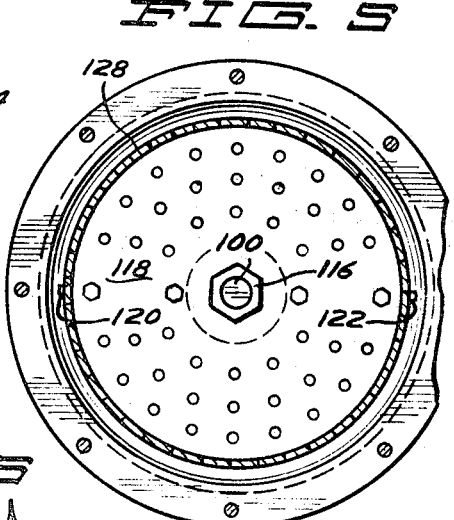

United States Patent Office 3,434,410
Patented Mar. 25, 1969

3,434,410
BOTTOM FEED QUENCH DRYER APPARATUS
Edward L. Galle, St. Paul, Minn., assignor to The Pillsbury Company, Minneapolis, Minn., a corporation of Delaware
Filed Apr. 9, 1965, Ser. No. 446,801
Int. Cl. A23b 5/02; B01d 1/00
U.S. Cl. 99—246   11 Claims

ABSTRACT OF THE DISCLOSURE

A food dehydration apparatus composed of a plurality of tanks each connected to a source of vacuum and each containing a centrifuge basket just slightly smaller than the tank itself. Heaters are connected to the sides of the tanks for heating the contents of the tanks. During operation, food products to be dehydrated are placed in the centrifuge baskets, a vacuum is drawn within the tank, a heat transfer medium such as oil heated to about 400° F. is introduced to the tank and while the vacuum persists the centrifuge basket is rotated at about 400 r.p.m. to remove excess oil. The product is removed from one tank while the other is in operation.

---

The present invention relates to an improved apparatus for dehydrating food products. More particularly, the invention provides an improved apparatus for removing moisture from cellular food products by chilling the food products and thereafter contacting the food products with a liquid heating medium.

The commercial advantages of dehydrating various moist food products, particularly preservation and weight economy, are well known. The quality of the final products obtained from various dehydration methods is judged by such factors as general physical appearance, color, flavor, nutritive value, extent of denaturing, rehydrating characteristics and keeping properties. In many instances, poor quality is tolerated because of economic reasons. Poor quality generally results from excess heating for prolonged periods of time, which detrimentally affects flavor and other heat sensitive properties, and from oxidation, which deteriorates color, flavor, and nutritive value. Also it results from procedures which cause extensive shrinkage in volume and changes in physical form. In an effort to meet the demand for high quality dehydrated particulated products, vacuum evaporators have been employed which employ processing temperatures of the order of from about 140 to 230° F., under partial vacuums of the order of from 22 to 29 inches mercury column. With such equipment, certain moist food products can be dehydrated without serious impairment of heat sensitive or oxidizable constituents, having reference particularly to food products which do not have a high water content. However, with conventional vacuum dehydration equipment, heat transfer to the material undergoing dehydration is at a relatively slow rate, particularly in instances where the particles have limited contact with each other and for items of high water content, thus greatly extending the period of evaporation. The masses or particles undergoing dehydration are supported in metal trays, and in many instances considerable physical impairment of the articles occurs due to over-heating and burning of the surfaces in contact with the tray, to sticking to the tray due to exuding juices, and to changes in physical form and size. Because of the above and other difficulties it is generally considered that conventional vacuum dehydration is impractical for fresh particulated fruits and vegetables of high water content.

Freeze drying, which has reference to vacuum drying while the product is frozen, is effective with some materials to produce good dehydrated products. Particular disadvantages of this method are the relatively high costs of equipment required for a given capacity, and high cost per unit weight of material dehydrated. Also, according to my observations, many of the products produced by freeze drying have undesirable properties. For example, many products (e.g. the meat of fowl) are quite friable and tend to break during handling.

A limiting factor of all commercial shelf-type dryers, including vacuum and freeze-dryers, is that heat is conducted through a metal surface with which the material is in direct contact. When it is attempted to charge the trays or shelves with a quantity of particles to a depth greater than one layer, much of the material does not have direct heat transfer contact, and heat transfer thru adjacent particles is insufficient for practical operation.

It is known that moist food particles can be dehydrated by immersion in hot oil. When carried out at atmospheric pressure the extended time and temperature factors involved cause undesirable changes in flavor, palatability, color, form and volume. If the oil temperature is increased to shorten the drying time, then serious burning occurs. With a lower oil temperature there is a tendency for the material to cook without substantial evaporation. By application of a partial vacuum the treatment time can be shortened, but if economical charge ratios of product to oil are used, the time required is extended beyond practical limits. Also undesirable physical changes occur, such as excessive shrinkage and handling. Products dehydrated as described above are characterized by lack of rehydratability, which is caused by the amount of oil present and its distribution in the product.

As a modification of the oil dehydration method, it has been proposed to freeze the source material, introduce it into a body of hot oil at a temperature of the order of 180° F. or less, and thereafter apply a partial vacuum to carry out dehydration, with heat being supplied to the oil to maintain the temperature level. While such a process may somewhat improve the quality of some products such as meat, it again is subject to disadvantages as mentioned above, including heat injury, uneconomical charge ratio, prolonged time cycle to complete dehydration, and high residual oil content in the final product.

Numerous processes have been previously proposed for dehydrating food products such as fruits and vegetables. Among these processes are those disclosed in patent applications entitled, "Dehydrating Method, Product and Apparatus," Ser. No. 157,538, filed Dec. 6, 1961, now Patent No. 3,261,694 and "Dehydrating Method and Apparatus," Ser. No. 157,478, filed Dec. 6, 1961, now Patent No. 3,335,015 both of which are assigned to the assignee of the present application. According to the first of these applications, a vertically movable centrifuge basket which is mounted with an elongated cylindrical treatment tank is filled with food product and then moved to the upper end of the tank. Next, a partial vacuum is created within the tank and the lower end thereof is filled with a heated oil. The basket is then lowered to the bottom of the tank allowing the food therein to contact the heated oil. In an alternative arrangement, the centrifuge basket is mounted for rotation at the lower end of an elongated treatment tank but is not free to move vertically. A butterfly valve is provided above the centrifuge tank and perforated rotary screen is optionally provided above the rotary valve. Dehydration can be accomplished either above the butterfly valve with the valve in a closed position or if desired, dehydration can be accomplished with the butterfly valve in an open position. The valve is then closed following dehydration in which event the smaller isolated portion of the housing below the butterfly valve facilitates the application of a higher vacuum.

In the second application referred to hereinabovve, a much longer vertically disposed column or tank is provided. Within this tank are two vertically spaced butterfly valves for separating the column into a plurality of vertically spaced treatment zones. In operation, the food being dehydrated passes first through the upper zone and then through the lower zone. The total column in this case is about 10 times the height of the centrifuge basket.

A preferred form of the present invention has the following capabilities. First, the invention makes possible the provision of a greatly simplified apparatus for reliably producing dehydrated products of outstanding quality and requires substantially less capital investment through the use of highly simplified processing equipment. At the same time the invention provides even greater production speeds than were obtained previously with comparable equipment.

A preferred form of the invention is characterized by the provision of a treatment tank which is about equal in size to the centrifuge basket with sufficient clearance being provided to prevent contact between the basket and the inner walls of the tank when the basket is rotated. Another feature of the invention is a provision enabling the treatment tank to be easily and quickly opened so as to expose a substantial portion of the centrifuge basket. Still another feature of the invention is a provision enabling the centrifuge basket to be removed without releasing a fastener or other retaining means whereby the treated food can be quickly removed from the treatment tank after it has been processed. Another feature of the invention is the provision for efficiently supplying heat to the contents of the treatment tank after they have been introduced therein and by the provision of a plurality of operatively associated treatment tanks adapted to be operated sequentially.

Briefly stated, the steps performed in a preferred form of my invention include providing a hydrous food product, placing the food product in a foraminous enclosure such as a centrifuge basket which is mounted within a treatment tank and then creating a partial vacuum within the treatment tank. A heating medium maintained at a temperature above 212° F. is then introduced into the centrifuge whereby the chilled food product is contacted by the heating medium in situ. The treatment is then allowed to proceed for a predetermined period of time. During this treatment the heating medium is present in a highly foamed turbulent condition substantially filling the treatment tank as moisture present within the food product is converted to a vapor. Next, the centrifuge is operated and the tank drained to remove excess oil from the food product. The vacuum can then be released and the food product removed from the treatment tank.

In view of the defects in the prior art it is one object of the present invention to provide an improved apparatus for carrying out low pressure dehydration of food products accompanied by a violent evaporation of moisture in a highly turbulent foamed medium within a centrifuge enclosure and treatment tank which is only slightly larger than the centrifuge enclosure.

Another object is the provision of an improved food dehydration apparatus of a relatively small size wherein food products can be treated by contacting with a hot oil but wherein losses of oil from the centrifuge are not excessive.

Another object of the invention is the provision of a food dehydration apparatus including a treatment tank with a centrifuge basket therein and a means for quickly and easily opening the treatment tank to expose a substantial portion of the centrifuge basket.

Yet another object of the invention is the provision of an improved food dehydration apparatus including a centrifuge basket which can be removed without the release of fasteners or other retaining means when the treatment tank is opened.

Still another object of the invention is the provision of an improved food dehydration apparatus including a means for effectively heating the contents of the treatment tank either before or after treatment has commenced.

Yet another object of the invention is the provision of an improved food dehydration apparatus including a plurality of communicatively connected tanks adapted to operate sequentially.

Still another object of the invention is the provision of an improved food dehydration process for the removal of moisture under partial vacuum with violent evaporation of moisture in a highly turbulent foamed medium wherein the food product is contacted by the heating medium in situ.

Another object of the invention is the provision of an improved process for removal of moisture from a food product under partial vacuum wherein the time required for each treatment cycle has been substantially reduced through the sequential operation of a plurality of treatment tanks each including a centrifuge means.

Yet another object of the invention is the provision of an improved means for dehydrating food products under partial vacuum wherein loss of the heating medium through vacuum lines can be reliably controlled.

Another object is to provide a dehydration apparatus adapted to produce food of a commercially acceptable quality at improved production rates. These and other objects of the invention will become apparent in view of the following description of my preferred form of the invention:

FIGURE 2 is a flow chart illustrating the processing steps performed in accordance with the invention;

FIGURE 3 is a front elevational view of the treatment tanks and associated apparatus in accordance with the invention on an enlarged scale as compared with FIGURE 1;

FIGURE 4 is a vertical sectional view of one treatment tank and centrifuge on a still larger scale;

FIGURE 5 is a horizontal sectional view taken on line 5—5 of FIGURE 4; and

FIGURE 6 is a horizontal sectional view taken on line 6—6 of FIGURE 4 with the centrifuge basket removed.

Figure 1:
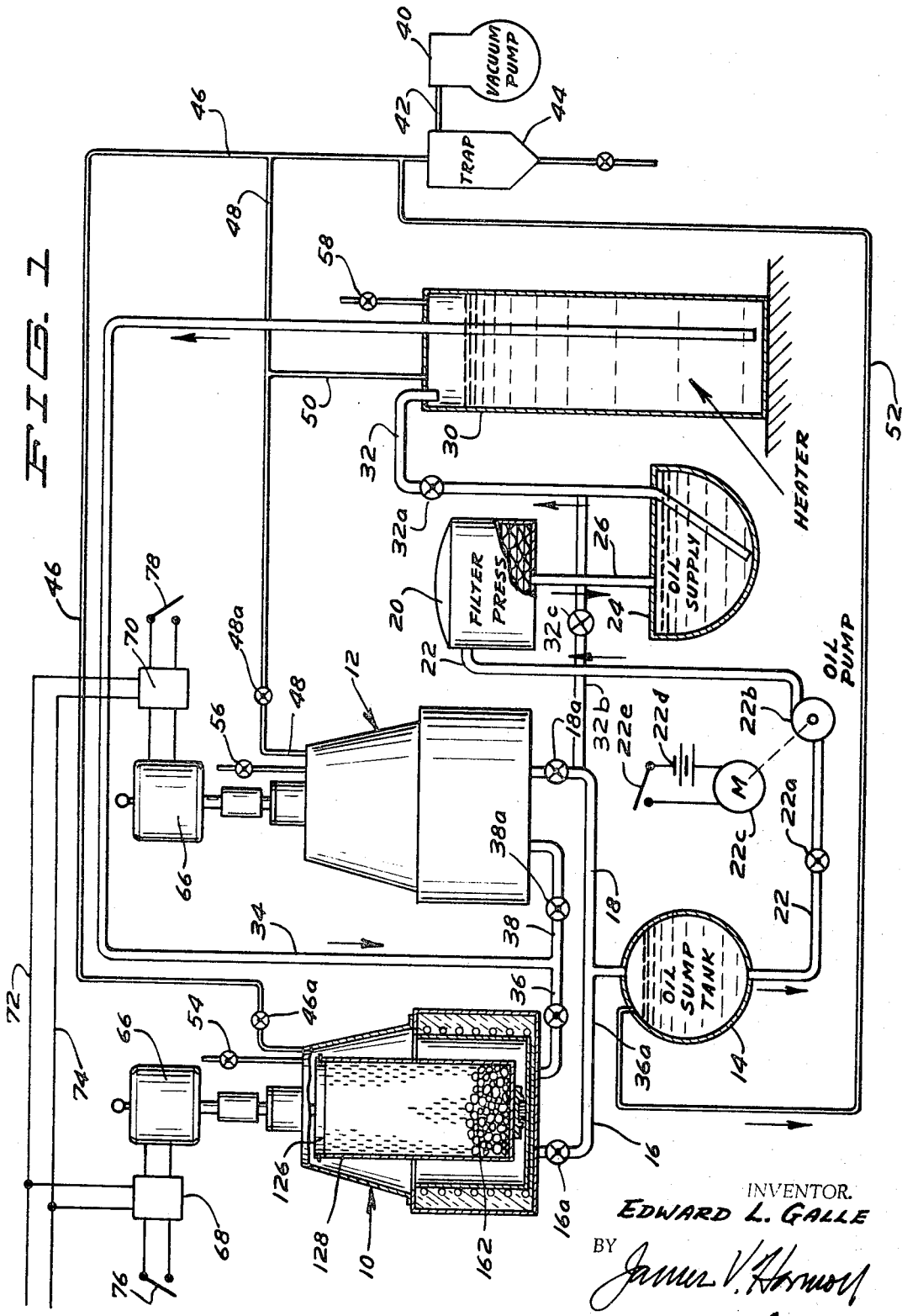
FIGURE 1 is a combined hydraulic and electrical schematic diagram of the invention.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

As can be best seen in FIGURE 1 there is provided a plurality of identical vessels or treatment tanks indicated at 10 and 12 and an oil sump tank 14 connected to the tanks 10 and 12 respectively through lines 16 and 18 and to a filter press 20 of known construction by means of an outlet line 22. The filter press communicates with an oil supply tank 24 through a line 26 and the oil supply tank 24 in turn communicates with a heating means such as an electrically operated heater 30 through an oil line 32. Connected between line 18 and line 32 is a line 32b having a pump 32c. The heater 30 is provided with an outlet line 34 which in turn leads to a pair of lines 36 and 38 leading to the bottom of the vessels 10 and 12 respectively.

Appropriate valves are provided for controlling oil flow as required. Accordingly, lines 16 and 18 are provided with valves 16a and 18a respectively, in line 22 is a valve 22a. The line 22 is also provided with a pump 22b operated by a drive means such as an electric motor 22c wired in series with a source of current 22d and a switch 22e. The line 32 is provided with a valve 32a and lines 36 and 38 respectively are provided with valves 36a and 38a.

To evacuate the treatment tanks 10 and 12 there is provided a vacuum pump 40 which is connected by means of a duct 42 to an oil trap 44 of a suitable known construction. The trap is in turn connected by lines 46 and 48 respectively to the interior of the tanks 10 and 12. Connected to line 48 is a line 50 which communicates with the interior of the heater 30. An additional line 52 communicates between line 46 and the oil sump tank 14.

Lines 46 and 48 each include a suitable shutoff valve 46a and 48a respectively. Communicatively connected to the tanks 10 and 12 are suitable vacuum release valves 54 and 56. The heater 30 is provided with a similar vacuum valve 58.

As can be seen in FIGURES 1, 3 and 4, there are provided two mounting pedestals 60 each of which consist of a plurality of horizontally spaced vertically disposed and aligned columns 62 is rigidly affixed to a pair of vertically spaced and horizontally disposed parallel plates 64. To the upper end of each pedestal 60 is mounted an electric motor 66. As shown in FIGURE 1, the motors are suitably connected relays 68 and 70 to which current is supplied from a commercially available power line 72 and 74. The relays 68 and 70 are controlled by suitable switches 76 and 78 respectively.

Refer now to FIGURES 3 through 6. As shown in FIGURE 3, a supporting framework 80 is provided which includes uprights 82 and 84 formed from angle irons or the like secured to horizontally disposed beams 85 and 86. A plurality of cross members 87 extend from the front to the rear of the framework i.e., normal to the plane of the paper as seen in FIGURE 3. Diagonal braces 88 and 90 extend upwardly from the columns 82 and 84 to the inward ends of the beams 86. The ends of the beams 86 are rigidly secured as by welding to the horizontally disposed cross members 87 at each end of the framework, one of which is shown in FIGURE 4. The ends of the latter beams are rigidly secured as by welding to the columns 82. Extending upwardly to the beams 85 from the upward end of diagonals 90 are uprights 94.

Rigidly mounted upon the framework 80 in horizontally spaced positions are the treatment tanks 10 and 12. The tanks are each supported upon blocks 91 (FIGURE 4) and can if desired be secured thereto by welding or the like. What is said with regard to the treatment tank 10 and associated apparatus will also be true of the treatment tank 12. As can be seen in FIGURES 3 and 4 the treatment tanks include upper and lower cylindrical sections 93 and 95 respectively. Suitably affixed to the cover section 92 as by bolts 96 is an outwardly flared lip 98 the lower end of which contacts a horizontally disposed and radially extending flange 100 provided on the upward edge of the bottom portion 94 of the tank. Between the lip 98 and the flange 100 is mounted a suitable resilient sealing means such as a rubber O-ring 102.

As clearly shown in FIGURE 4 at the upward end of the cover 93 is a packing gland 104 within which is rotatably mounted a drive shaft 106. The upper end of shaft 106 is secured to a suitable coupling 108 to the shaft 110 of motor 66. To the lower end of the shaft 106 is suitably rigidly secured as by bolts 112 and 116 a driving means such as a driving plate 118 including radially extending dogs 120 and 122 which fit loosely within downwardly extending grooves 124 and 126 respectively in the upward edge of a cylindrical centrifuge basket 128. During operation, rotation of the shaft 106 and drive means 118 will impart rotary movement to the centrifuge basket 128.

At the lower end of the basket 128 is provided a separable bearing indicated generally at 130 and including a conical outer race 132 bolted to the bottom of the basket 128 and an inner race 134 rigidly secured to the bottom portion 95 of the tank. As can be seen in FIGURES 4 and 6, the bottom portion 95 of the treatment tank 10 is secured to the bottom of the jacket 140 and support blocks 90 by any suitable means such as bolts 147. A suitable friction reducing means such as rollers 136 are provided between the races 132 and 134. There is thus no mechanical retaining means for securing the race 132 adjacent to race 136. Accordingly, when the basket 128 is lifted manually the rollers 136 remain in place on the race 134. When the basket 128 is replaced in the tank 10, the race 132 will slide easily over the rollers 136 and race 134 to the position shown in FIGURE 4 and the bearing 130 will again be ready for operation.

Positioned around the bottom portion 95 of the tank 10 is a heat insulation jacket 140. Within the jacket 140 is a heat supply means which is a coil of pipe 142 having inlet and outlet lines 144 and 146 to which steam or other suitable heated gas or vapor is supplied as required to maintain the treatment tank at the appropriate temperature. As shown in FIGURE 6 a temperature sensing means such as a thermocouple 143 is provided within the bottom of each treatment tank below the centrifuge basket. As clearly shown in FIGURE 4, the coils 142 are positioned adjacent the outward surface of the tank portion 95 for optimum heat transfer. Insulation 140 is positioned around the outside of the coil 142 to reduce heat losses.

During filling and emptying of the treatment tanks 10 and 12, the covers are conveniently removed and replaced by means of a suitable lifting means such as a hoist 160 only a part of which is shown.

In the present invention moist food material in particles of suitable size and at a low temperature level, is subjected to treatment under partial vacuum to complete a dehydration cycle, the treatment including dispersion of the particles in a mixed phase material or foam consisting of water vapor and hot oil. To start the cycle a quantity of hot oil is introduced into a quantity of a food product to be dehydrated under an applied partial vacuum. The temperature of the oil at the time of the initial contact is relatively high compared to the vaporization point of water at the applied partial vacuum, as for example from 240° to 600° F., the range of from 325 to 440° F. being preferred. In a typical instance the material is frozen and is at a temperature level below 32° F. Because of the great temperature differential between the material and the hot oil, a rapid heat exchange takes place whereby the outer surface layer of the product is flash heated in situ to the vaporization point of the hydrous juices present. Immediately the initial phase of the dehydration cycle proceeds at a rapid and controlled rate as determined in part by the speed with which the oil is introduced to the tank. Rapidly evolving vapor forms a mixture of vapor and oil or what can be termed a foam, of greatly increased volume (e.g. more than three times the normal volume of oil and product), with violent agitation or churning action. The oil temperature drops immediately and rapidly and the evolving vapor creates a high rate of vapor flow to the evacuating means employed. The surfaces of the material and the outer layers through which dehydration progresses, are protected by the rapidly evolving vapor against burning by direct contact with the hot oil. During this initial phase the material is subject to certain conditions which make for novel properties in the final product, as will be presently explained.

After the first initial phase of rapid evaporation the rate of vapor flow diminishes, the foam subsides, and the level of the oil body returns to near its initial level. Thereafter (assuming that a low moisture content is desired) dehydration is continued at a lower temperature level to complete the cycle. The major part (e.g. 75 to 95%) of the moisture present in the material is removed in the short time (e.g. ½ to 4 minutes depending largely on particle size, moisture content and initial temperatures of the particles, ratio of particle weight to weight of oil, and oil temperature) of the first rapid evaporation phase, and the remaining moisture (except for residual) is removed at the lower temperature level. In general the overall time period of treatment in the hot oil, under applied partial vacuum, is relatively short, and may in typical instances be of the order of from 7 to 40 minutes.

When the moisture content of the material has been reduced to the value desired, any one of a number of procedures can be followed, depending on the character of the final product required. One procedure is to break the vacuum after separation of free oil from the product by draining, after which some further oil may be removed by centrifuging. However, for most of the applicable source materials I prefer to effect a general separation between the free oil and dehydration material, and then to subject the material to centrifuging, all under partial vacuum, after which the vacuum is broken. Such procedure produces certain novel and desirable properties in the final product.

It may be explained that the product tends to be buoyant at the end of the initial phase and while the vacuum is maintained, but sinks in the oil if the vacuum is released before the oil is removed. Thus separation before the vacuum is broken can be carried out by removing oil from below the floating material, with final depositing of the material on a screen through which oil may drain.

The flow diagram illustrates one procedure for carrying out my method. The moist edible food material to be dehydrated is first subjected to preparatory operations, the nature of which are dependent upon the material being treated, and the desired character of the final product. In general the preparation or pre-treatment will include cleaning, and when the items are of substantial size, cutting, slicing or otherwise reducing the items to masses or particles of suitable size for processing. Thereafter the material is chilled to produce a free flowing frozen bulk material. Such material can be stored at temperature levels of the order of minus 40 to plus 20° F., until being introduced into my process. Conventional freezing techniques can be used, such as a technique known as "individual quick frozen."

The invention is applicable to various categories of food materials, including fruits and berries, vegetables, condiments, meats, fowl, sea food, cereal grains, dried fruit and formulated products, all of which can be prepared to form chilled particles suitable for processing. A wide variety of fruits can be treated by my method, including peaches, apricots, pineapple, cherries, bananas, grapes, dates, strawberries, blueberries and the like. Vegetables which are applicable include peas, carrots, potatoes, celery, cabbage, bean sprouts, onions, peppers, sweet potatoes, cereals and the like. Meats that are applicable include beef, pork, lamb, processed meats such as ham, corned beef, cured pork and the like. As to fowl, reference can be made to chicken, turkey, pheasant, duck and the like. As to sea food, reference can be made to shrimp, both fresh and cooked, tuna and other fish such as are commonly marketed, oysters, clams, lobsters, crab and the like. As condiments, reference can be made to mushrooms, water chestnuts, and various spices and herbs.

The larger fruits like peaches, can be peeled, pitted and sliced or cubed into pieces not thicker than about ½ inch. Smaller items such as cherries, blueberries, and grapes can be cleaned and frozen without reduction in size.

Fresh vegetables can be cleaned and prepared by use of conventional procedures such as are employed in the frozen food and canning industries. Blanching can be applied before freezing to minimize enzymatic activity. Multiple perforating or scarifying can be applied before or after freezing to such materials as peas, Chinese pea pods, and the like. Here again where the items are of substantial size, they are reduced to particles (e.g. slices or cubes) of a size suitable for processing.

Meats like beef, pork or lamb can be prepared by cutting and trimming to suitable size, followed by cooking, draining and freezing.

Fowl (e.g. chicken and turkeys, etc.) can be prepared by cleaning and cooking, removal of the flesh from the bone and skin, and cutting into pieces of suitable size, after which the flesh is frozen. Tenderizing treatments can be used, such as slow freezing and/or intermediate thawing and refreezing.

Sea food, such as shrimp, cod or other fish flesh, can be prepared by cleaning, cooking and shelling followed by freezing. In some instances cooking may be omitted.

Condiments such as fresh mushrooms, water chestnuts, and the like can be prepared by cleaning and cutting, followed by freezing. Where the source material in this category is in dry form, such as dry mushrooms, they can be cleaned and partially rehydrated before freezing.

As indicated above some source materials may have been processed by other methods. For example materials like cherries may have been subjected to processing to produce a product of the maraschino type. Pork may have been preserved as ham, or beef as corned beef. Materials like cereals, chick peas (garbanzo beans) or Japanese tree mushrooms, may have been air or sun dried, whereby they require rehydration before freezing. Dried fruits like dates, peaches or apples may have been partially dehydrated by air or sun drying. Vegetables like cucumbers may have been preserved by pickling.

Although I prefer to employ the individual quick freeze method to produce a free flowing bulk frozen material, in some instances it is satisfactory to freeze in the form of slabs, provided such slabs quickly fall apart into the individual frozen particles when the slab is immersed in the hot oil.

Assuming that the food material has been prepared and chilled to a temperature level below 32° F. and preferably of the order of minus 40 to plus 20° F., which in most instances results in freezing, it is contacted with hot oil in step 11, preferably by depositing a measured charge of the frozen material into a predetermined quantity of hot oil while the oil is being subjected to a partial vacuum.

At the end of the dehydration phase, which is characterized by creation of a mixed vapor-oil medium, the medium or foam subsides, and thereafter the cycle is continued at a lower temperature level to attain a desired low moisture content. At the end of the dehydration cycle, the resulting products are separated from free oil. This is carried out while application of partial vacuum is continued, as by separating oil from the buoyant material followed by centrifugation. Thereafter the vacuum is released and the product removed from the treatment chamber. This procedure serves to produce final products having a substantial amount of oil content derived from the process as, for example, an oil content that may range from 50 to 60% (dry solids basis). Such oil content can be somewhat reduced by centrifuging while the material being treated is at a temperature level above the melting point of the oil (e.g. 120 to 140° F.), whereby the oil readily leaves the pores of the dehydrated product. With this procedure, products can be obtained having oil contents that may range in a typical instance from about 40 to 50% (dry solids basis).

The process followed in accordance with the present invention will now be described with particular reference to FIGURE 2. As can be seen in FIGURE 2 a hydrous food product which is to be dehydrated is first prepared and chilled. As described above the food product is preferably reduced to a suitable size such that thickness of each piece is no greater than about ½ inch and preferably less than ¼ inch. The best thickness will, of course, depend upon the nature of the food product being treated, the applied pressure at which treatment takes place and the treatment temperature.

The temperature to which the food products are chilled will depend again upon the nature of the particular food product being treated as well as other process variables. In most applications to which the present invention is employed it is preferred that the food product be chilled at least to the freezing point and preferably below at least minus 10° F. After the product has been chilled, the centrifuge basket 128 is filled to a level of not more than about half full and preferably from about ¼ to ⅓ full. The lifting means 160 is then operated so as to lower the covers 92 into the closed position shown in the figures. The valves 46a and 48a are then opened with the vacuum pump in operation and the valves 16a and 36a or 38a and 18a are closed. A vacuum will then be created in one of the treatment tanks 10 and 12. The partial vacuum established should be at least 11 inches of mercury and preferably over at least 18 inches of mercury.

Initial rapid evaporation from the outer layer, progressing inwardly, involves rapid outward flow of vapor, which tends to prevent an overall collapsing or excessive shrinkage of the particles as evaporation proceeds.

Although evolved vapor flows rapidly through the outer layer of the particles with inflation of tissue, as moisture evaporation progresses inwardly the tissue is not disintegrated and it remains in the particle without material spacial re-orientation. The extent to which the tissue may be disrupted or is altered is dependent upon the source material. The soft, sponge-like tissue found in succulent vegetables like celery is altered to a substantial extent, whereas the cell tissue of a material like cooked beef is not materially altered. Because evaporation takes place in the outer layer of each particle before evaporation has proceeded to the central region, some stiffening of the outer tissue tends to occur before the frozen core has disappeared, and such stiffer outer layer serves to maintain the general form of the particle, and to retain inner tissue within the space defined by the outer layer. The outer layer remains pervious to evolving super heated water vapor, and does not form a matted and relatively impervious skin. Such a surface skin, which is commonly experienced in other dehydrating methods and is referred to as case hardening, is objectionable for many reasons, including the fact that it forms a heat insulating and moisture barrier, which impedes heat transfer and moisture evolution, and in the final product modifies the physical appearance and interferes with rehydration.

A wide variety of oils and fats can be used. For example, I can employ various oils and fats of vegetable or animal origin. As examples of vegetable oil, reference can be made to corn, cottonseed, rice bran, soy, olive, peanut, coconut, sesame, tomato seed and the like. As examples of animal oil, reference can be made to fish oil, beef tallow, lard, butter oil, and the like. Generally it is desirable to use oils or fats which have been refined to the point where they do not impart any undesirable odor or flavor to the product. The so-called hydrogenated oils have been used with good results, such as hydrogenated shortening fats. In general the higher melting point oils, such as cottonseed flakes (melting point about 150° F.) tend to be retained to a lesser degree by the final product.

In addition to the impregnating ingredients referred to above, it is possible to utilize liquid solvents, applied by spray or by immersion of the material after centrifuging in the vacuum, and before the vacuum has been released. Thereafter release of the vacuum serves to cause the liquid solvent to penetrate the pores of the product. A solvent can thus be used as a medium for introducing certain ingredients into the product, such as certain vitamins and enzymes. Thereafter excess solvent can be removed by centrifuging and/or evaporation.

Materials in the vapor phase also can be applied to the final product before the vacuum is broken, such as aromatic flavoring. Thus if a seasoning vapor is introduced into the space occupied by the centrifuge basket at or near the end of the centrifuge operation, but before rotation of the basket has terminated and before or during breaking of the vacuum, some aromatic or volatile flavoring ingredients can be caused to penetrate the pores. Instead of a vapor, atomized or spray droplets of a normally liquid seasoning can be applied in the same manner.

A characteristic of my method is that it carries out evaporation in the absence of atmospheric oxygen. Therefore oxidation of constituents of the food material is maintained at a minimum. To inhibit oxidation during storage, I may in some instances introduce one or more anti-oxidants into the treatment oil, whereby any small amount of oxidation tending to occur during evaporation is inhibited. Assuming that such anti-oxidants are used in the last processing oil, then such inhibiting action is continued by presence of some residual oil in the final product.

When sequential operation is employed, the partial vacuum will be produced in one tank while the other is either being emptied or filled. Prior to the time a tank is filled a heating medium such as an edible oil is warmed to a temperature of above 212° F. and preferably to a temperature from about 300 to 400° F. In the form of the invention shown in FIGURE 1 the temperature of the heating medium is established and maintained in the heater 30. The valves 36a and 38a are then opened for a period of time sufficient to allow the heating medium within the heater 30 to pass through the lines 34, 36 and 38 to the tanks 10 and 12. Since the treatment tanks 10 and 12 are operated sequentially only one of the valves 36a and 38a will be operated at a time. It should be apparent that as the heating medium enter either treatment tank 10 or 12, the oil will contact the food material in situ. When a plurality of tanks are used, one tank is evacuated, filled partially with oil and centrifuged when another is being emptied and refilled. The first of these is then emptied and refilled when the latter is evacuated, exposed to heated oil and centrifuged.

In a modified form of practicing the invention the oil is heated while being continuously recirculated through either tank 10 or 12 as desired. This is accomplished by opening one of valves 16a or 18a and 32a, closing valve 22a and turning on pump 32c. The oil in tank 10 or 12 can thereby be maintained at an elevated temperature as long as desired.

The oil or other heating medium will contact the food material first at the bottom and gradually rise within the treatment tank 10 until all of the food material in the tank is covered. The proper level is established by a sight glass on the side of the treatment tank (not shown).

Concerning the amount of oil to use it was found that about 10 times as much oil should be used as food product on a weight basis. Thus, if 200 pounds of product are used 2,000 pounds of oil should be supplied. Extremely rapid introduction of the oil into the treatment tank should be avoided since it can in some cases cause an evolution of foam so violent that the vacuum lines 46 and 48 will be either partially or completely filled with oil. In most cases the oil should be introduced into the tank in a period of over at least 5 seconds and preferably between about 10 and 15 seconds.

Concerning the temperature of the oil, it was found that satisfactory operation will take place when the oil is heated to 360° F. even though the temperature of the oil within the treatment tank will under most operating conditions drop to approximately 190° to 200° F. While the heating medium should have an initial temperature of over 212° F. the preferred temperature is substantially higher. It is, of course, apparent that the final temperature of the oil be below 212° F.

After the oil has been thus introduced to the treatment tank there will take place a violent evaporation of moisture from the food product with the heating medium converted to a highly turbulent foamed state. During this period of time lasting from about 15 seconds to 2 minutes and preferably between about 30 seconds and 1 minute the moisture contained within the food product will be removed.

The tank drain valve 16a or 18a, as the case may be, can then be opened and the heating medium within the tank withdrawn therefrom to the oil sump tank 14 which as can be seen is also maintained under partial vacuum by line 52. The switch 76 or 78, as the case may be is then closed causing the motor 66 to operate thereby imparting rotary motion to the basket 128 through shaft 106 and drive means 118.

The speed at which the centrifuge is operated again is not considered critical but should be over about 200 G's. It was found with the basket having a diameter of 10 inches rotating at a speed of 400 r.p.m. that 100 G's could be produced and satisfactory operation obtained. If rotation speeds are not high enough or for a sufficient period of time excessive amounts of oil will be retained in the food product being processed. If the G forces are on the other hand too high, it is possible for the food product to become compressed which is undersirable. It was found that with a centrifugation force of 100 G's and a final oil temperature of about 195° F. that a centrifugation time of about 5 to 10 minutes and preferably 1 to 2 minutes was satisfactory for most food products. It will, of course, be understood that if food product is one which tends to entrap and retain oil, longer centrifugation times can be employed.

After centrifugation is completed, one of the valves 54 or 56, as the case may be, is opened thereby admitting air to the tank which was evacuated. The motor 66 on top of the tank 92 is then elevated by the lifting means 160 and the centrifuge basket 128 removed manually and dumped into a suitable storage bin (not shown). The basket 128 is then placed back within the lower portion 94 of the tank 10 or 12 and additional food product 162 placed within the basket for the next cycle of operation. Whenever tank 14 becomes filled the motor 22c is operated by closing the switch 22e thereby pumping used oil from the oil sump tank 14 through the filter press 20 to the oil supply tank 24. he switch 22e can be operated either manually or if desired by a float controlled switch (not shown).

In some instances (e.g., corn) the product obtained is suitable for eating without further treatment by the consumer. Also products like garbanza beans, lentils, chestnuts or cereal grains, when dehydrated in accordance with my method, can be subjected to browning and seasoning to produce a highly edible nut-like product.

In most instances my dehydrated product will be further processed by the consumer before it is eaten. For example, dehydrated vegetables like green peas can be immersed in warm water for rehydration, after which they are subjected to conventional cooking. As a simpler procedure the housewife may introduce a measured quantity of the dehydrated material into a cooking vessel, after which a predetermined amount of water is added, the vessel covered and placed in a warm oven. As the water is heated to the boiling point, it rehydrates the vegetable, and carries out the desired cooking. By this procedure the preparation of vegetables ready for eating may require not more than about 5 to 10 minutes. Instead of requiring the housewife to place a measured amount of the dehydrated material in a cooking vessel, the dehydrated material may be sold in a metal foil cooking vessel, whereby the housewife need only add a measured amount of water to this package and then place it in a hot oven for a predetermined period of time.

In some instances, the dehydrated product instead of being sold as such can be introduced into so-called baking pre-mixes. For example, dehydrated blueberries made in accordance with my method can be introduced into a dry pancake pre-mix, whereby when a pancake batter is formed with water or milk the blueberries tend to hydrate with hydration being completed while the pancakes are being cooked. With respect to such pre-mixes, a desirable feature of my vegetable and fruit products is that they suspend themselves in the pre-mix, and in the baked dough, and it floats in light batters of the pancake type.

The product resulting from the foregoing method has novel properties which distinguish it from dehydrated products produced by prior methods. Considering particularly products made by aplication of centrifuging under continued partial vacuum at the end of the dehydration cycle, all of my products are of excellent quality, having reference to such characteristics as color, flavor, nutritive value, form and size, fragility, shelf life, rate and extent of rehydration.

Color retention is good to excellent, including retention of the fresh green and red color of fruits and vegetables, as has been demonstrated by actual color analyses. Mushrooms are an exception in that they take on the light brown color of cooked mushrooms, presumably due to chemical changes in color constituents, probably caused by enzymatic activity, and not to surface browning or pick-up of color from the treatment oil. There is a slight deepening of color in all products but not to an extent sufficient to materially modify the original color tone. Some materials which have a natural white color, like sliced potatoes, are slightly darkened to the extent of taking on an off-white or light cream color. Such coloring can be minimized by special pretreatments, such as dipping the material before freezing into sulfite solutions or bleaching agents.

Flavor is excellent for all of the products. No burned or off-flavors are developed. The residual oil content derived from the method has no material masking or modifying effect on the flavor of the rehydrated product, unless desired flavoring constituents are deliberately added in the manners previously described. Blending in or substituting another oil for that used in the initial phase can serve to minimize or eliminate undesired pick-up of flavor or darkened particles from the initial oil.

The nutritive value of the products is substantially unimpaired, having particular reference to carbohydrates, proteins and vitamins. Starch granules such as are present in certain vegetables (e.g., potatoes, rutabagas, parsnips, turnips and sweet potatoes) are completely gelatinized. This enhances suitability for consumer use, and does not detract from nutritive value. The proteins present may be somewhat denatured, but without inhibiting rehydration or materially affecting flavor or nutritive value. High protein materials like meat, fowl, and seafood generally are cooked in pretreatment, and thereafter no further denaturing occurs in processing.

In form, the dried particles of the final products are similar to the particles of the source material. In other words, the original physical shape is largely retained in the final product. Shrinkage in volume is not excessive and can be minimized by the special procedures described, including vacuumizing during freezing, and/or application of a high vacuum at the end of the cycle.

All of my products are relatively durable in resisting mechanical attrition or abuse. Thus they can be handled or packaged without the development of excess fines. This is in contrast with certain dehydrated products produced by the freeze-dry method, such as cooked meat, fowl and seafood, which are quite fragile. I attribute lack of fragility to the plasticizing effect of oil derived from the method and distributed mainly as minute globules in the intercellular spaces, and to retention of the natural bond between the cells, which appears to be lost or impaired in the freeze-dry method.

As indicated by accelerated oxidation tests, shelf life is as good or in some instances better than products made by the freeze-dry method, having reference to the ability of material to resist deterioration by oxidation when exposed to the atmosphere. The oil content derived from the method tends to protect low fat materials from oxidation, and to inhibit absorption of atmospheric moisture.

My products are excellent with respect to rate and extent of rehydration. This is an important characteristic because it is intended that the products be rehydrated before being consumed. Tests have shown that products made by my method, when immersed in water at 60° C. rapidly absorb water to form materials which in form, size, appearance and texture, are substantially the same as the source materials. The residual oil content does not interfere with such absorption, which I attribute to the fact that residual oil derived from the method is dispersed mainly in the form of minute discrete masses, as distinguished from plates, films or other masses of substantial size which tend to block moisture penetration and absorption. The minute discrete masses are distributed at random, being mainly in the intercellular spaces and in the outer rather than the inner regions. Good rehydrating properties are also attributed to the fact that the product is porous whereby it is readily penetrated by water. The tissue or cell structure is readily wettable and water absorptive, and has the ability to revert to a form and character comparable to that of the original source material.

The amount of oil derived from the method and retained in the product varies with the manner in which the process is carried out, the character of oil employed, and with the particular material being treated. Some retain more oil than others under the same treatment conditions. I attribute this to differences in chemical and physical properties, including differences in the make-up of the tisue or cell structure. Materials which normally have a substantial amount of oil or fat, such as cooked meat, lose only a small amount of their natural fat, and retain some of the oil used in dehydration.

Actual tests have shown that a wide variety of fresh vegetables when dehydrated by my method have a retained oil content per unit volume ranging from about 100 to 200 mg./cc. Fruits produce products having somewhat more fat per unit volume, such as from 100 to 235 mg./cc. Cooked meat and fowl produce products within the range of about 100 to 150 mg./cc. Seafood like shrimp and fish produce products within the range of about 150 to 255 mg./cc. Condiments like mushrooms produce products of the order of 140 to 160 mg./cc.

The process in accordance with my invention has a number of important advantages over the processes disclosed in the application referred to hereinabove. First, the apparatus required for the process can be vastly reduced in size. Although the treatment tank is of an appropriate size to just contain the centrifuge basket it was found that contact between the heating medium and the food products with the food product in situ resulted surprisingly in little loss of oil through the vacuum lines and at the same time produced satisfactory product quality. By contrast in the processes referred to hereinabove the product was either dumped from a supporting screen or required an additional storage means and an auger in the event the product was to be added slowly to the treatment tank.

It was also found that the time to complete a cycle of operation was reduced with my apparatus and process owing to the efficiency with which product and oil can be both placed within and removed from the treatment tank. Important advantages of my invention result from the fact that the treatment tank can be opened thereby exposing a substantial portion of the centrifuge basket and from a provision enabling the centrifuge basket to be removed from the treatment tank without the release of a fastener or the like. Still further, increase in production speeds is made possible by the use of a plurality of tanks operated sequentially. Thus, while an operator is filling tank 10 the tank 12 can be undergoing centrifugation and while tank 10 is being evacuated tank 12 can be emptied.

I claim:

1. A dehydrating apparatus for hydrous food products comprising in combination a plurality of treatment tanks, a centrifuge basket in each tank, each treatment tank being about equal in size to the centrifuge basket with sufficient clearance to prevent contact between said baskets and each tank during rotation of the baskets, a duct means communicating with each treatment tank for removing air therefrom, a duct means communicating with each treatment tank for supplying a heating liquid thereto and a duct means communicating with each treatment tank for removing said heating liquid from each treatment tank following the said contact of the food product within each treatment tank by the heating liquid, said heating liquid being thereby adapted to contact the food product in situ, said tanks being adapted to dehydrate food products in sequence with the dehydrated food product within one tank being removed during the dehydration of food material in the other of said tanks.

2. An apparatus for dehydrating moisture containing food products comprising in combination at least one treatment vessel including a cover having side walls and a top wall and a bottom portion having side walls and a bottom wall a means for providing a hermetic seal between the cover and the bottom portion of the treatment vessel, a centrifuge basket mounted for rotation within the treatment tank, said centrifuge basket having side walls which extend substantial distance above the upward edge of the bottom portion of the treatment tank and a drive means operatively connected to the basket whereby the basket is accessible for quick removal from the tank.

3. The combination of claim 2 including a means for supplying vacuum to said treatment tank and a means for introducing and removing a liquid heating medium to the tank.

4. An apparatus for removing moisture from food products under partial vacuum comprising in combination a treatment tank having a removable top, a centrifuge basket therein mounted for rotation upon a vertical axis, a bearing supporting the centrifuge basket at the lower end thereof, said bearing comprising two mating parts adapted to nest within one another, said mating parts being otherwise unconnected mechanically and being separable from one another whereby the basket is capable of being removed from the treatment tank after the cover has been lifted off the basket without unfastening the bearing.

5. The apparatus according to claim 4 wherein a heat supply means is operatively associated with the treatment tank for heating the treatment tank during operation.

6. The apparatus according to claim 4 wherein a plurality of said treatment tanks are provided for operation in sequence.

7. The apparatus according to claim 6 wherein a heat supply means is operatively associated with each treatment tank for heating the contents of each treatment tank during operation.

8. The apparatus according to claim 6 wherein said bearing means comprises an upper portion rigidly connected to the centrifuge basket having an erect frusto conical shaped internal bore and an inner race rigidly secured to the bottom of the treatment tank and adapted to rest within said outer race and a plurality of circumferentially spaced friction reducing members between the said races whereby the centrifuge basket can be quickly removed from the treatment tank.

9. An apparatus for dehydrating food products under partial vacuum comprising in combination a plurality of treatment tanks, each treatment tank including a cover and lower portion, the cover and the lower portion having side walls and an end wall, a drive means connected to the cover and including a shaft extending downwardly therethrough into the treatment tank, a centrifuge basket mounted for rotation about a vertically disposed axis within the treatment tank and operatively connected to the said shaft at the upward end thereof, bearing means between the lower end of the basket and the bottom of the treatment tank, means for evacuating treatment tank and for supplying a heaing liquid thereto, a source of vacuum, duct means communicating between the source of vacuum and each of the treatment tanks, a heating means for storing a heating liquid, duct means communicating between the heating means and each of the treatment tanks for supplying said heating liquid thereto, and means operatively associated between the heating means in each tank and between the vacuum means and each tank for controlling the application of vacuum and flow of heating liquid to said tanks sequentially.

10. The apparatus according to claim 9 wherein means is provided for collecting, filtering and storing said heating liquid after it has been supplied to the treatment tank.

11. An apparatus for removing moisture from food products under partial vacuum comprising in combination a plurality of treatment tanks each having a removable top, a centrifuge basket therein mounted for rotation upon a vertical axis, a bearing supporting the centrifuge basket at the lower end thereof, said bearing comprising two mating parts adapted to nest within one another, said mating parts being otherwise unconnected mechanically and being separable from one another whereby the basket is capable of being removed from the treatment tank after the cover has been lifted off the basket, said bearing means comprising an upper race rigidly connected to the centrifuge basket having an erect frusto-conical shaped internal bore and a lower race rigidly secured to the bottom of the treatment tank and adapted to rest within the upper race and a plurality of circumferentially spaced friction-reducing members between said races whereby the centrifuge basket can be quickly removed from the treatment tank.

References Cited

UNITED STATES PATENTS 3,239,946  3/1966  Forkner _____ 99—403 X

ROBERT W. JENKINS, *Primary Examiner.*

U.S. Cl. X.R.

99—199